No. 697,580. Patented Apr. 15, 1902.
W. A. P. WERNER.
APPARATUS FOR THE PRODUCTION OF FIBERLESS FILAMENTS.
(Application filed Aug. 19, 1901.)
(No Model.)
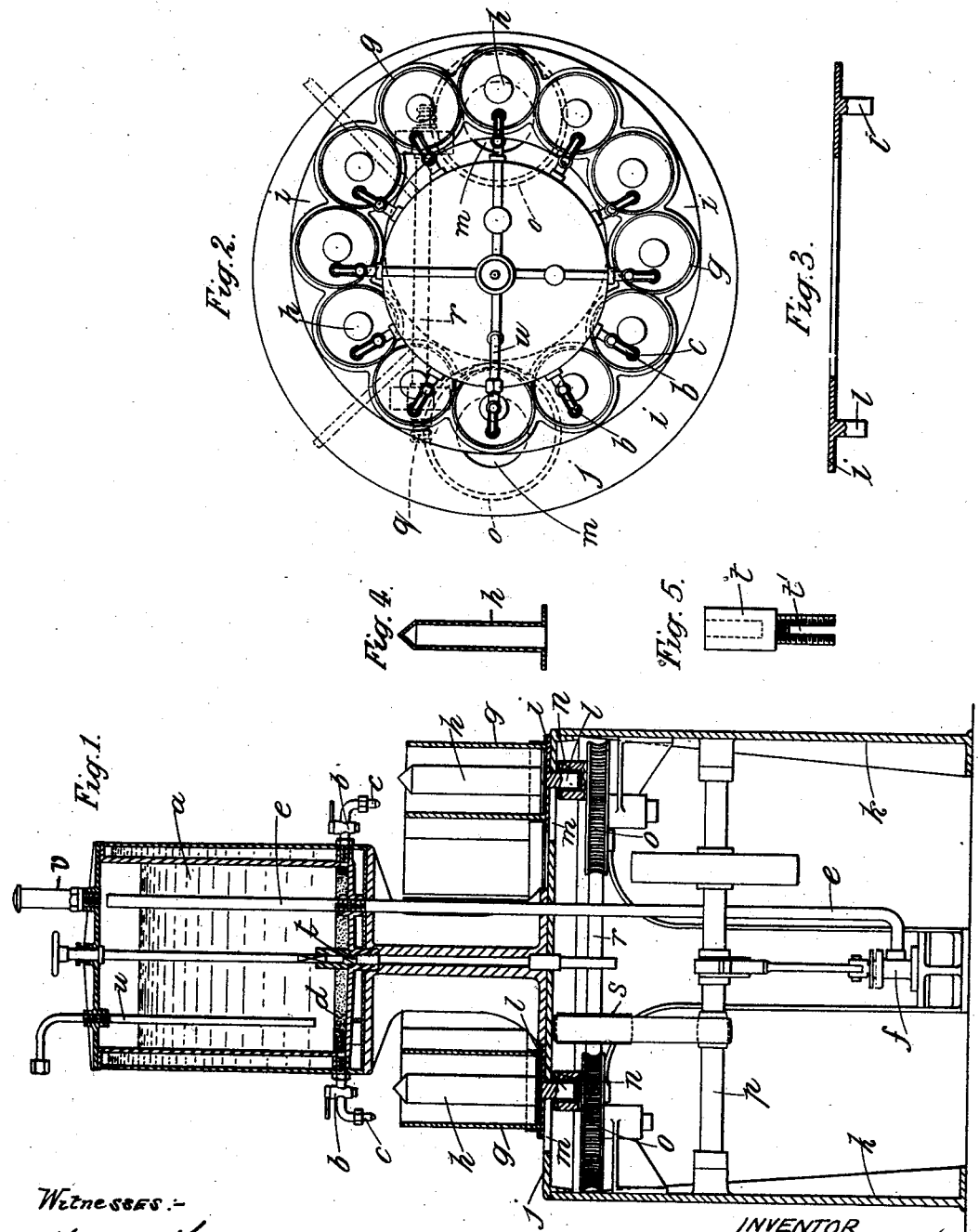

UNITED STATES PATENT OFFICE.

WILLIAM ARTHUR PERCY WERNER, OF LONDON, ENGLAND.

APPARATUS FOR THE PRODUCTION OF FIBERLESS FILAMENTS.

SPECIFICATION forming part of Letters Patent No. 697,580, dated April 15, 1902.

Application filed August 19, 1901. Serial No. 72,615. (No model.)

*To all whom it may concern:*

Be it known that I, WILLIAM ARTHUR PERCY WERNER, engineer, a citizen of Great Britain, residing at 50 Knowle road, Brixton, London, S. W., England, have invented new and useful Improvements in Apparatus for the Production of Fiberless Filaments, (for which I have applied for patent in Great Britain, No. 1,850, bearing date January 26, 1901,) of which the following is a specification.

This invention relates to apparatus for the production of fiberless filaments, and particularly to certain fiberless filaments suitable for use in the manufacture of various articles as a substitute for silk or hair.

The invention consists of an apparatus in which the filaments are produced by forcing out the material by pressure of air and in which the filaments are automatically wound upon spools by a gyratory motion communicated to them.

The invention more especially pertains to the production of filaments from cellulose, which is dissolved in a basic solution of zinc nitrate, chlorid, or other suitable zinc salt, and for the production of this material I dissolve purified cellulose in the solution of the zinc salt of a specific gravity of about 1.8 and at a temperature of about 90° centigrade, and for some purposes calcium nitrate or calcium chlorid may be added to the solution. The solution may be then filtered to remove any suspended impurities or undissolved cellulose.

In the apparatus provided according to the invention the solution is forced through a nozzle to form a filament, and this filament passes around a spool into a receptacle containing methylated spirits or other liquor which will coagulate the cellulose in the form in which it issues. On the spool being completely wound with the filament the spool may be taken out of the receptacle, and the filament may be washed in spirits or water and may then be artificially dried by suitable means. The filament will then be ready for use.

The filament produced has the appearance, strength, and gloss of raw silk and has the property of receiving and retaining forms given to it by pressure and in this respect resembles raw silk, for which it may be substituted in various manufactures. The effect of pressure in giving any desired form may be augmented by dry or moist heat.

Dies and mordants may be added to the material prior to the formation of the filament as may be required to produce any particular color, and gelatin or other such ingredient may be added to the material for the purpose of rendering it waterproof, the gelatin being rendered insoluble in the coagulating liquor by the addition to the latter of formaldehyde or other such well-known reagent.

The invention is illustrated in the accompanying drawings, in which—

Figure 1 is a sectional elevation of an apparatus constructed according to the invention. Fig. 2 is a plan corresponding to Fig. 1. Fig. 3 is a detailed sectional elevation of a ring or disk employed in the construction of the apparatus. Fig. 4 is a detailed sectional elevation of one of the spools employed, and Fig. 5 is a detail elevation of valve.

Now in carrying the invention into effect, as illustrated in the accompanying drawings, the solution of cellulose is placed within a closed and jacketed receptacle $a$, around which water may circulate for maintaining the solution at a proper temperature. Around the lower end of the receptacle $a$ a series of valve-cocks $b$ are radially arranged, having nozzles $c$ fixed to their extremities, which have a bore corresponding to the gage of the filament to be produced, and around the interior of the receptacle and over the outlets leading to the valve-cocks $b$ a suitable strainer $d$ may be provided to retain any impurities or undissolved cellulose that the solution may contain. The solution being of a viscous consistency is forced out of the receptacle $a$ by means of compressed air, which is conveniently admitted through a pipe $e$ from below, which terminates at the upper part of the receptacle $a$, such pipe $e$ being connected to an air-pump $f$, operated by the machine. Beneath each of the nozzles $c$ a corresponding number of casings $g$ are provided, within which spools $h$ are carried and within which also methylated spirits or other coagulating solution is introduced. The whole of these casings $g$ are arranged upon a ring or disk $i$, to which a substantially gyratory motion is communicated by suitable mechanism. For this purpose the ring or disk $i$ may be supported upon a convenient surface, such as a table $j$, constituting part of the frame $k$ of the machine, and studs or projections $l$ may be provided upon the ring or disk $i$, so as to downwardly protrude through circular slots $m$, provided in the table, the studs or projections $l$ being carried within journals $n$, provided upon worm-wheels $o$, arranged in diametrically opposite positions on the frame $k$ of the machine. These worm-wheels $o$ may receive motion from the main shaft $p$ of the machine by suitable means. For example, worms $q$, Fig. 2, may be mounted adjacent to their periphery upon a common shaft $r$, upon which a pulley $s$ may be mounted for communicating motion to it from the main shaft $p$ of the machine, from which the pump $f$ may be operated.

It will be understood that in operation the air is forced in at the top of the receptacle $a$, containing the solution. The valve-cocks $b$ are opened, thereby forcing out the filament into the several casings $g$ beneath. Meanwhile a gyratory motion is communicated to the disk or ring $i$, upon which each of the casings $g$ are mounted, so that the filaments are arranged around the spools $h$ within the casings in circular fashion, and the methylated spirits contained within the casing coagulate or harden the filaments.

A screwed valve $t$, having lateral outlets $t'$, may be arranged at the bottom of the receptacle $a$ for the withdrawal of the solution, which may be admitted by means of an inlet-pipe $u$, reaching preferably to the bottom of the receptacle.

A level-indicator and a pressure-gage $v$ may be provided on the receptacle $a$, respectively, for indicating the level of the solution and the pressure of air upon it.

What I claim as my invention, and desire to secure by Letters Patent, is—

1. In apparatus for the production of fiberless filaments in combination, a receptacle for the solution, casings for the reception of the filaments discharged from the receptacle, and means for effecting the relative motion of the receptacle and casings.

2. In apparatus for the production of fiberless filaments in combination, a receptacle for the solution, casings for the reception of the filaments discharged from the receptacle, and means for giving a gyratory motion to the casings.

3. In apparatus for the production of fiberless filaments in combination, a receptacle for the solution, casings for the reception of the filaments discharged from the receptacle, a disk upon which such casings are mounted, and means for giving a gyratory motion to the disk.

4. In apparatus for the production of fiberless filaments in combination, a receptacle for the solution, casings for the reception of filaments discharged from the receptacle, a disk upon which such casings are mounted, wheels arranged beneath the disk and connection between the wheels and the disk by which a gyratory motion is given to the disk on the rotation of the wheels.

5. In apparatus for the production of fiberless filaments in combination, an air-tight receptacle for the solution, an air-pump in communication with said receptacle to maintain pressure of air upon the solution contained therein, casings for the reception of the filaments discharged from the receptacle, and means for effecting the relative motion of the receptacle and casings.

6. In apparatus for the production of fiberless filaments in combination, a receptacle for the solution, a water-jacket for said receptacle, casings for the reception of the filaments discharged from the receptacle, and means for effecting the relative motion of the receptacle and casings.

7. In apparatus for the production of fiberless filaments in combination, a receptacle for the solution, casings for the reception of the filaments discharged from the receptacle, removable spools within said casings upon which the filaments are wound, and means for effecting the relative motion of the receptacle and casings.

8. In apparatus for the production of fiberless filaments, a circular receptacle for the solution, valve-cocks radially arranged thereon by means of which the solution is discharged therefrom in filaments, casings for the reception of the filaments, and means for effecting the relative motion of the receptacle and casings.

9. In apparatus for the production of fiberless filaments, a circular receptacle for the solution, valve-cocks radially arranged thereon by means of which the solution is discharged therefrom in filaments, nozzles mounted in the valve-cocks, casings for the reception of the filaments, and means for effecting the relative motion of the receptacle and casings.

In testimony whereof I have signed my name to this specification in the presence of two subscribing witnesses.

WILLIAM ARTHUR PERCY WERNER.

Witnesses:
   WILLIAM EDWARD EVANS,
   KATHLEEN KING.